United States Patent Office 3,493,546
Patented Feb. 3, 1970

3,493,546
PROCESS FOR PREPARING FLUOROCARBON POLYMERS FOR USE AS PROPELLANT BINDERS
Ernest L. Cottrill, Dover, and Joseph Green, East Brunswick, N.J., assignors, by mesne assignments, to the United States of America as represented by the Secretary of the Navy
No Drawing. Filed Apr. 1, 1968, Ser. No. 717,988
Int. Cl. C08g 17/06
U.S. Cl. 260—78.4      3 Claims

ABSTRACT OF THE DISCLOSURE

A process for preparing a polymer having use as a binder for propellants and having good pot life and the ability to cure at room temperature comprising admixing a fluorocarbon diol with an organic diacid and terminating the produced polymer chains with —$CH_2COOH$.

CROSS-REFERENCES TO RELATED APPLICATIONS

Patent application of Ernest Cottrill and Joseph Green entitled, "Terpolymer Binders for Propellant Oxidizers," Ser. No. 761,303 filed Sept. 20, 1968.

BACKGROUND OF THE INVENTION

Solid propellants are being widely used, particularly by the military departments for rocket and missile propulsion. Basically a solid propellant charge is comprised of a fuel such as aluminum or magnesium powder, an oxidizer, and a binder. By way of example, U.S. Patent 3,260,208, which issued July 12, 1966, to Peter M. Schluter, discloses propellant compositions of synthetic resins such as polyethylene, polysulfide rubbers, polyethers, polyesters and polyurethanes which can be mixed with from 35% to 85% by weight of a solid oxidizer such as the nitrates and perchlorates of the alkali and alkaline earth metals.

Fluorine containing polymers have been commercially utilized for several years, as suggested in U.S. Patent 2,642,416, entitled, "Fluorinated Acrylates and Polymers," which issued June 16, 1953, to Arthur H. Ahlbrecht. This patent points out that although fluorcarbons have a low affinity for surfaces with which brought into contact, the polymers of esters of acrylic acid form tenacious films when coated upon a variety of surfaces, including cloths, papers, cellulosic films and metals; due, apparently, to the binding action of the oxy-carbonyl groups and to molecular orientation under the conditions involved in applying surface coatings.

Also, in U.S. Patent 3,282,905, entitled ,"Fluorine Containing Esters and Polymers Thereof" which issued Nov. 1, 1966, to Ross Wade Fasick and Stuart Raynolds, there is disclosed a mixture of fluorine containing polymers and nonfluorine containing polymers having use as water and oil repellents for textiles, paper, leather and other fibrous and porous materials which will absorb and transport low surface tension liquids either on their surfaces or into their interstices by capillary action. The advantages gained is that relatively small amounts of a fluorine containing methacrylate polymer can be used with major amounts of a cheaper polymer with results that are actually superior to the fluorinated polymers themselves.

SUMMARY OF THE INVENTION

The present invention relates to a process for preparing a polymer composition having use as a propellant binder, and especially the binder has application for binding high-energy oxidizers such as nitronium perchlorate.

While at first it may appear obvious that fluorocarbon polymers would have utility as binders for propellants, due to their inert properties and their high theoretical performance, all heretofore commercially available fluorocarbon polymers have not made suitable binders. Some commercially available fluorocarbon polymers are non-curing and others can be cured but have extremely high viscosities even at elevated temperatures.

In the present invention, a polymer chain is produced by admixing a fluorocarbon diol with an organic acid and terminating the produced polymer chain with succinic acid. Unless the polymer chain is modified, extremely rapid cures are obtained with the carboxyl terminated fluoropolyesters due to the increase in carboxyl activity caused by an alpha $CF_2$ group, and this extremely rapid cure makes these fluoropolyesters unsuitable for production processes. By modifying the polymer chain, curing of the polymer with various imine curatives permit a pot life substantially longer than one hour at room temperature and also excellent cures are effected at room temperature.

It is therefore a general object of the present invention to provide a process for preparing fluorocarbon polymer that cure at room temperature and are compatible with high energy propellants.

Other objects of the present invention will become readily apparent from the following description and claims.

DESCRIPTION OF THE PREFERRED EMBODIMENT

One high energy oxidizer having great performance potential in solid propellants is nitronium perchlorate which is a hydroscopic white solid which decomposes without melting at about 115 degrees C. Nitronium perchlorate reacts exothermically and rapidly with atmospheric moisture or water and resulting in nitric and perchloric acids. The oxidizer will interact with organic materials containing olefinic unsaturation or other readily oxidized functional groups, however, this oxidizer is relatively unreactive towards completely saturated hydrocarbon and halogenated polymers. As a result, the requirements for a good binder system for nitronium perchlorate are compatibility with the oxidizer, low temperature castability, and the ability to cure at a low temperature.

New fluorocarbon polyesters may be prepared by admixing hexafluoropentanediol with either perfluoroglutaric acid or perfluoroglutaric acid chloride. The reaction for the former is:

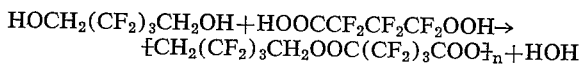

The admixing of hexafluoropentanediol and perfluoroglutaric acid chloride provides the following reaction:

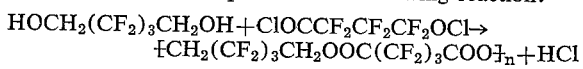

To illustrate the manner in which the invention may be carried out, the following examples are given. It is to be understood that the examples are for the purpose of illustration and the invention is not to be regarded as limited to any of the specific compounds or conditions recited therein.

EXAMPLE I 6 mols of hexafluoropentanediol were mixed with 5 mols of perfluoroglutaryl chloride. The hexafluoropentanediol was first purified by recrystallization from benzene to yield a white crystalline solid having a melting point between 78.5 and 80.5 degrees C. The perfluoroglutaryl chloride was purified by distillation through a 90-cm. glasspacked column at a reflux ratio of 10 to 1. The fraction taken boiled at 110.5 degrees C. at atmospheric pressure. Various curing studies were conducted and good cures resulting in rubbery solids were obtained with curatives such as isocyanates, triol-isocyanate mixtures and imines, in the ratio of between 0.75 to 1.5 parts of curvature to 1 part of the monomers. Although rubber products were obtained, the pot life of the system was very short, many being less than one minute. The hydroxyl terminated fluorocarbon polyester was compatible with nitronium perchlorate based upon visual observation, impact, and autoignition temperature measurements.

EXAMPLE II 6 mols of hexafluoropentanediol were mixed with 5 mols of perfluoroglutaryl chloride. The hexafluoropentanediol and the perfluoroglutaryl chloride were purified as in Example I. In order to prevent the extremely rapid cure which was obtained in Example I, the resultant polymer chain was terminated with —$CH_2COOH$ by the interaction of hydroxyacetic acid. Curing of the modified polymer indicated a pot life substantially greater than one hour at room temperature with excellent cures being effected at room temperature. The polymer was compatible with nitronium perchlorate based upon visual observation, impact, and autoignition temperature measurements.

EXAMPLE III 5 mols of hexafluoropentanediol were mixed with 6 mols of perfluoroglutaric acid. The hexafluoropentanediol was purified as in Example I, and the perfluoroglutaric acid was prepared by hydrolysis of perfluoroglutaryl chloride and vacuum distillation (120 degrees C. at 0.5 mm. Hg) to yield a white crystalline solid having a melting point of between 92 and 94 degrees C. Various curing studies were conducted and good cures resulting in rubbery solids were obtained with curatives such as epoxy resins and various di- and tris-imines. By way of specific example, tris (1-(2-methyl) aziridinyl) imine was used as a curative in the ratio of 1 part imine to 1 part polymer. The cure was at room temperature and the product was rubbery, with good strength. Although rubber products were obtained, the pot life of the system was very short with many being less than one minute.

EXAMPLE IV 5 mols of hexafluoropentanediol were mixed with 6 mols of perfluoroglutaric acid. The hexafluoropentanediol and the perfluoroglutaric acid were prepared as in Example III. In order to prevent the extremely rapid cure which was obtained in Example III, the resultant polymer chain was terminated with —$CH_2COOH$ by the interaction of succinic anhydride. Curing of the modified polymer with curatives such as epoxy resins and various di- and tris-imines indicated a pot life substantially greater than one hour at room temperature with excellent cures being effected at room temperature. The polymer was compatible with nitronium perchlorate based upon visual observation, impact, and autoignition temperature measurements.

It can thus be seen that the present invention relates to an improved process for preparing binders for high energy oxidizers by increasing the plot life of various polymers. Obviously many modifications and variations of the present invention was possible in the light of the above teachings. It is therefore to be understood, that within the scope of the appended claims, the invention may be practiced otherwise than as specifically described.

We claim:
1. A process for the preparation of a composition having use as a propellent binder comprising:
    producing a polymer chain by admixing a fluorocarbon diol with an organic diacid, and
    terminating the produced polymer chain by interaction with a compound selected from the group consisting of hydroxyacetic acid and succinicanhydride.
2. A process for the preparation of a composition having use as a propellent binder as set forth in claim 1 wherein said fluorocarbon diol is hexafluoropentanediol and said organic diacid is perfluoroglutaric acid chloride, said admixture being in the ratio of about 6 mols of hexafluoropentanediol to about 5 mols of perfluoroglutaric acid chloride, and wherein the termination of the polymer chain is produced by the interaction with hydroxyacetic acid.
3. A process for the preparation of a composition having use as a propellent binder as set forth in claim 1 wherein said fluorocarbon diol is hexafluoropentanediol and said organic acid is perfluoroglutaric acid, said admixture being in the ratio of about 5 mols of hexafluoropentanediol to about 6 mols of perfluoroglutaric acid, and wherein the termination of the polymer chain is produced by the interaction with succinic anhydride.

References Cited

UNITED STATES PATENTS 3,438,946   4/1969   Lichstein _____ 260—75

JOSEPH L. SCHOFER, Primary Examiner

JOHN KNIGHT III, Assistant Examiner

U.S. Cl. X.R.

44—21; 260—78.5